United States Patent [19]

Kurland

[11] Patent Number: 4,547,851
[45] Date of Patent: Oct. 15, 1985

[54] INTEGRATED INTERACTIVE RESTAURANT COMMUNICATION METHOD FOR FOOD AND ENTERTAINMENT PROCESSING

[76] Inventor: Lawrence G. Kurland, 26 Farmington La., Melville, N.Y. 11747

[21] Appl. No.: 474,983

[22] Filed: Mar. 14, 1983

[51] Int. Cl.[4] .................. G06F 3/04; G06F 15/24; G06F 15/44
[52] U.S. Cl. .................. 364/401; 364/410; 364/900
[58] Field of Search .................. 364/400–401, 364/404–405, 410–412, 200 MS File, 900 MS File; 235/7 R, 383

[56] References Cited

U.S. PATENT DOCUMENTS

| | | | |
|---|---|---|---|
| 3,588,838 | 6/1971 | Felcheck | 364/900 X |
| 3,668,307 | 6/1972 | Face et al. | 178/5.6 |
| 3,691,295 | 9/1972 | Fisk | 178/58 |
| 3,746,780 | 7/1973 | Stetten et al. | 178/6.6 A |
| 3,752,908 | 8/1973 | Boenke et al. | 178/5.6 |
| 3,757,225 | 9/1973 | Ulicki | 325/308 |
| 3,836,888 | 9/1974 | Boenke et al. | 340/172.5 |
| 3,903,402 | 9/1975 | Petit et al. | 235/151.21 |
| 3,968,327 | 7/1976 | Gregg, III | 178/6.8 |
| 4,001,785 | 1/1977 | Miyazaki et al. | 340/172.5 |
| 4,008,369 | 2/1977 | Theurer et al. | 358/84 |
| 4,028,733 | 6/1977 | Ulicki | 360/10 |
| 4,054,911 | 10/1977 | Fletcher et al. | 358/141 |
| 4,064,490 | 12/1977 | Nagel | 364/200 |
| 4,075,686 | 2/1978 | Calle et al. | 364/200 |
| 4,084,229 | 4/1978 | Taylor et al. | 364/200 |
| 4,117,605 | 10/1978 | Kurland et al. | 35/9 A |
| 4,122,519 | 10/1978 | Bielawski et al. | 364/200 |
| 4,128,757 | 12/1978 | Garner, Jr. | 235/383 |
| 4,143,360 | 3/1979 | Bernhart et al. | 340/711 |
| 4,164,024 | 8/1979 | Gilbert | 364/900 |
| 4,191,956 | 3/1980 | Groothuis | 340/789 |
| 4,222,111 | 9/1980 | Sloan et al. | 364/900 |
| 4,247,106 | 1/1981 | Jeffers et al. | 364/410 X |
| 4,251,691 | 2/1981 | Kakihara et al. | 179/2 TV |
| 4,264,925 | 4/1981 | Freeman et al. | 358/86 |
| 4,283,709 | 8/1981 | Lucero et al. | 364/410 X |
| 4,296,476 | 10/1981 | Mayer et al. | 364/900 |
| 4,306,388 | 12/1981 | Yuter | 52/6 |
| 4,333,152 | 1/1982 | Best | 364/410 X |
| 4,388,689 | 1/1983 | Hayman et al. | 364/401 |
| 4,396,985 | 8/1983 | Ohara | 364/405 |
| 4,415,065 | 11/1983 | Sandstedt | 235/383 |

OTHER PUBLICATIONS

Wilkinson, Jr., "Restaurant System", *IBM Technical Disclosure Bulletin,* vol. 24, No. 9, Feb. 1982, (pp. 4630–4631).

*Primary Examiner*—Jerry Smith
*Assistant Examiner*—Gary V. Harkcom
*Attorney, Agent, or Firm*—Stiefel, Gross, Kurland & Pavane

[57] ABSTRACT

An interactive restaurant communication system (10) provides integrated food and entertainment processing which enables restaurant patrons to accomplish both food selection and select and receive entertainment on a common video monitor (56) at their table. The patrons can obtain menus for individual food selection on the video monitor (56) at their tables and individually enter their orders into a table station "intelligent" terminal (12, 14, 16, 18, 20) at their tables. In addition they can select from and interactively play a variety of remotely retrievable interactive entertainment activities using the video monitor (56) while waiting for the food to arrive, and if desired, where applicable, have the food and entertainment charges automatically added to a composite bill which may be printed at the table station terminal (12, 14, 16, 18, 20) or at a remote central location. The food and entertainment functions of the terminal (12, 14, 16, 18, 20) are down-line loaded from a central data base (22, 32) in response to terminal requests therefor.

11 Claims, 7 Drawing Figures

TABLE STATION 1

INTEGRATED INTERACTIVE RESTAURANT COMMUNICATION METHOD FOR FOOD AND ENTERTAINMENT PROCESSING

CROSS-REFERENCE TO RELATED APPLICATIONS

This application is related to the commonly owned copending U.S. patent application entitled "Integrated Interactive Restaurant Communication System for Food and Entertainment Processing", filed Mar. 14, 1983, bearing U.S. Ser. No. 474,984, and naming Lawrence G. Kurland, the named inventor herein, and Eli Gilbert as joint inventors, the contents of which is specifically incorporated by reference herein in its entirety.

TECHNICAL FIELD

The present invention relates to interactive communication systems and particularly to interactive restaurant communication systems.

BACKGROUND ART

Interactive communication systems, such as those employing video display terminals, are well known in the art, such as disclosed, by way of example, in U.S. Pat. Nos. 4,064,490; 4,054,911; 4,296,476; 4,143,360; 4,191,956; 4,122,519; 3,903,402; 4,001,807; 4,001,785; 4,075,686; 4,084,229; 4,251,291; 3,746,780; 3,668,307; 3,836,888; 3,752,908; 3,691,295; 3,968,327; 4,008,369; 4,028,733; 3,757,225; 3,814,841; 4,117,605; 4,264,925 and 4,164,024. Today, this field is a very active one, particularly with the advent and wide spread use of microprocessors in many business applications, as well as in personal computers, such as disclosed in U.S. Pat. No. 4,296,476. These prior art interactive systems have expanded dramatically in the field of cable television, such as disclosed in many of the aforementioned exemplary patents, both in two-way communication systems, such as disclosed in U.S. Pat. Nos. 3,691,295 and 3,668,307 by way of example, and in one-way cyclical transmission systems such as disclosed in U.S. Pat. Nos. 4,064,490 and 4,054,911 by way of example, as well as in real-time interactive systems such as disclosed in U.S. Pat. No. 4,264,925 by way of example. Moreover, point-of-sale terminals have become almost a total replacement for the cash register in today's businesses. The restaurant business, however, has been very slow to modernize in the area of service to the public except for modern fast-food operations, still relying on separate waitress serice for order taking and separate entertainment features such as music boxes or video games, and the computer revolution has really not caught up. Rather, increased efficiency in restaurant service has primarily been focused on better manual systems, such as the one developed at the Tifflin Inn in Denver, Colo. where a food coordinator person in the kitchen would interface between the waitresses, who never left the dining room, and the cook using busboys to transport the orders which were assembled on carts. This system, however, although sucessful, was still a manual system and did not integrate food and entertainment functions. Thus, although cash register type of point-of-sale systems and automatic order entry systems have made in-roads into the restaurant business, as has distributed interactive video game technology, applicant is not aware of any prior art systems which have sucessfully integrated interactive entertainment and food functions so that a plurality of independent table station terminals, via down-line loading and two-way communication with a central data base, can accomplish, among other things, transmission of orders to the kitchen, independently selectable down-loading of entertainment modules to the table stations for interactive play at the terminals; automatic computation of composite bills for both food and entertainment, and accumulation of detailed information for restaurant management.

These disadvantages of the prior art are overcome by the system of the present invention.

DISCLOSURE OF THE INVENTION

The present invention relates to an interactive integrated restaurant information communication system for enabling both individualized food and entertainment interactive information communication, such as two-way communication over a common transmission media, between a central remote data base and a plurality of different multipurpose table station terminals located at various table stations throughout the restaurant for use by the restaurant patrons for both food selection, based on down-line loaded food menu modules selectably retrieved from the central data base, and entertainment selection and interactive play, such as video games, also based on down-line loaded entertainment modules selectably retrieved from the central data base. The charges, where applicable, for both the entertainment and food selections can be compositely automatically billed to the table station, with each patron having a unique identification code for billing and/or service purposes, and the bills printed either centrally or at each table station.

The central data base comprises a central main computer which essentially performs the information routing functions, and remote retrievable storage for storing the various food and entertainment programs or sets of control instructions which are retrieved by the various table station terminals in response to selections made by the restaurant patrons, as well as handling coordination or processing and display of food orders in conjunction with kitchen and bar monitors, accumulation of restaurant management information and billing as well as other functions, if desired. Each of the table station terminals comprises a microprocessor and local storage which is down-line loaded with selected sets of control instructions from the central data base, under control of a master control program, in response to patron selection, and a local video display which is utilized to display data for food and entertainment selection as well as to interactively play the game or entertainment selected, with the microprocessor processing incoming data to enable food and entertainments selections to be transmitted to the central data base and to enable the retrieved entertainment to be interactively played at the terminal in response to the retrieved locally stored selected set of control instructions. The food orders, under control of the central computer, are collected from the various table station terminals, and displayed on central kitchen and bar monitors, with the orders being cleared from the monitor screen, such as by using touch-sensitive screens, as they are filled for each table station. If desired, the orders can be assembled by table station, each having its unique patron identification code, and transported to the pertinent table station. Thus, each table station terminal can independently serve to provide both food selection and entertainment functions, interactively with a central data base, in the integrated restaurant communication system of the present invention, whereby the overall efficiency of the restaurant will be enhanced and better controlled.

BEST MODE FOR CARRYING OUT THE INVENTION

Figure 1:
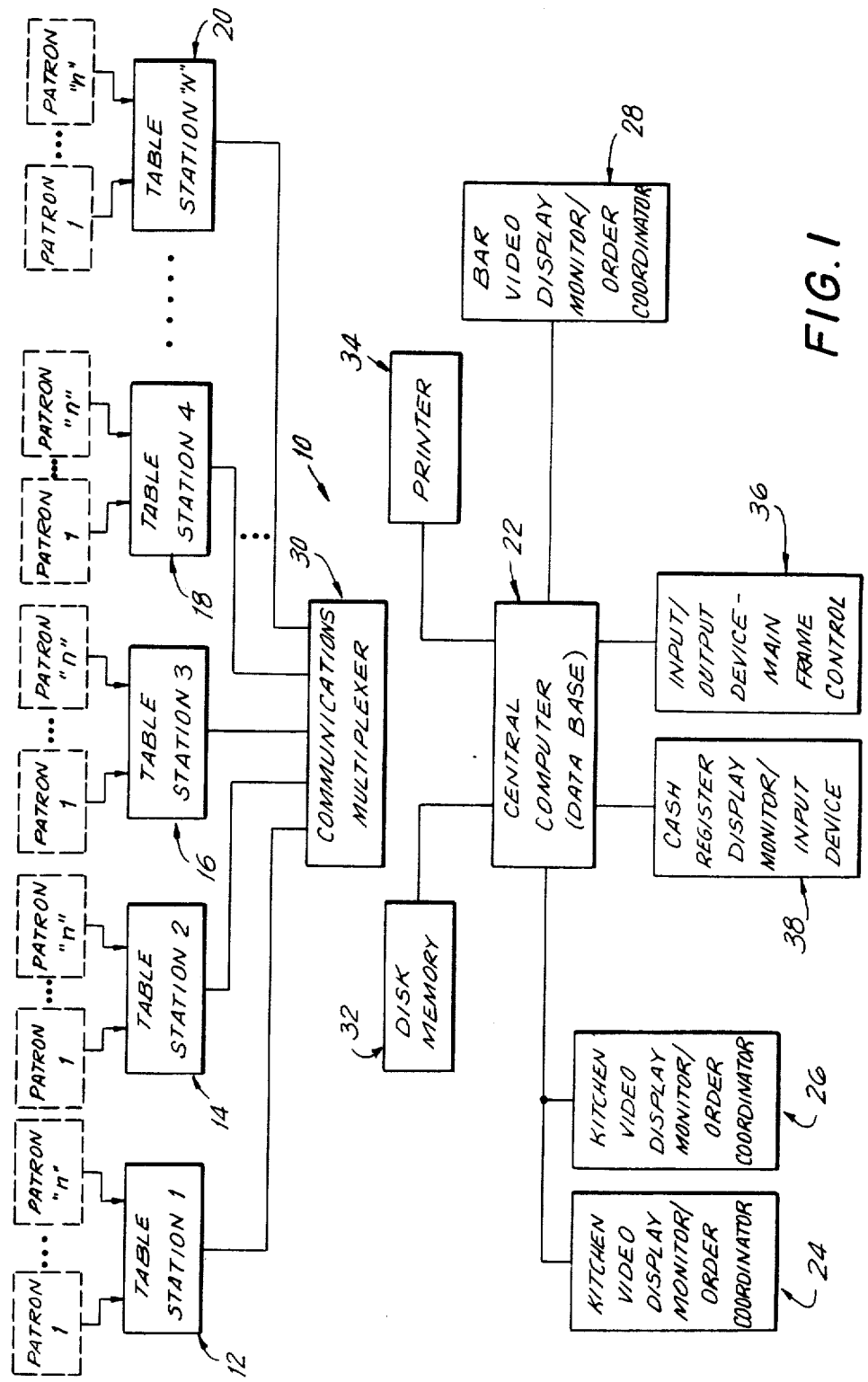
FIG. 1 is an overall functional block diagram of the presently preferred embodiment of the integrated interactive restaurant communication system of the present invention for providing integrated food and entertainment processing in accordance with the present invention.
Figure 5:
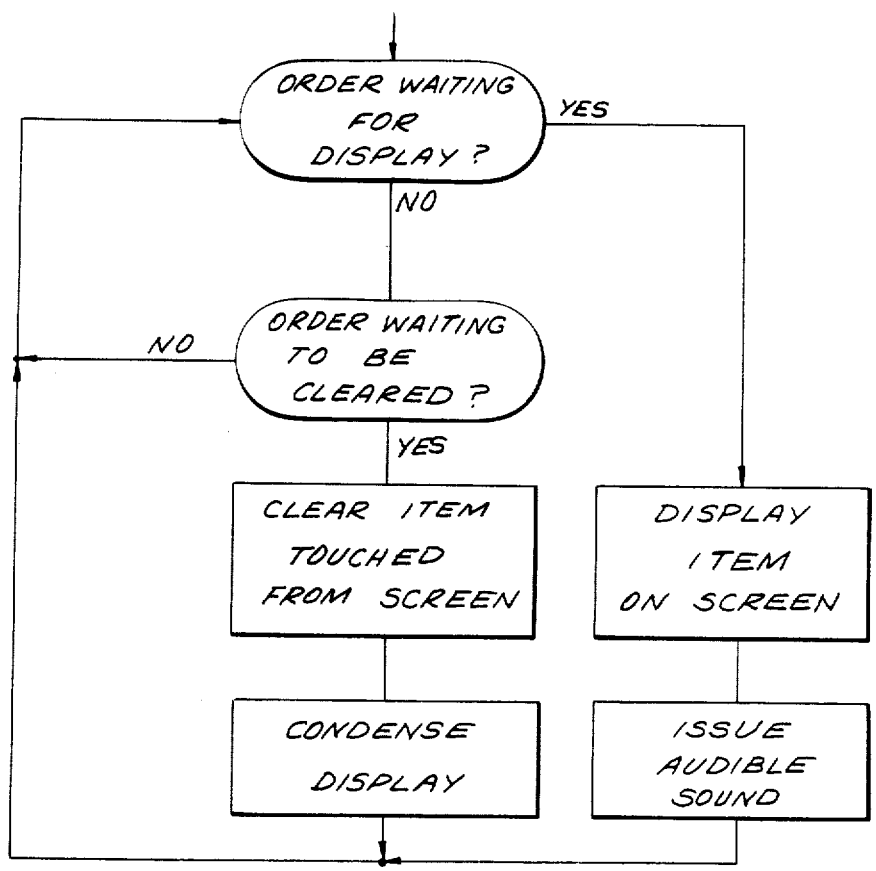
FIG. 5 is a condition responsive logic flow diagram of a typical kitchen or bar monitor processing control program for a typical kitchen or bar monitor in the system of FIG. 1.

Referring now to the drawings in detail, and initially to FIG. 1 thereof, an overall functional block diagram of the presently preferred embodiment of the integrated interactive restaurant communication system, generally referred to by the reference numeral 10, of the present invention is shown. As will be described in greater detail hereinafter, the interactive restaurant communication system 10 provides integrated food and entertainment processing which enables restaurant patrons to obtain menus for individual food selection on a video monitor at their tables, individually enter their orders into a table station "intelligent" terminal at their tables, select from and interactively play a variety of remotely retrievable interactive entertainment activities using the video monitor while waiting for the food to arrive, and if desired, where applicable, have the food and entertainment charges automatically added to a composite bill which may be printed at the table station terminal or at a remote central location. Moreover, as will be further described herein, the system 10 of the present invention is preferably integrated into the overall restaurant operation so that the food orders placed at the various table station terminals, with five such table station terminals 12, 14, 16, 18 and 20 being shown by way of example in FIG. 1, can be collected and routed by a central computer 22 to the kitchen and bar for display on video terminals or monitors 24, 26 and 28, respectively, for the cook and bartender to enable the orders to be promptly filled, which orders, as illustrated in FIG. 5, can also be displayed by time logged into the system 10 to enable the oldest orders to be filled first. In addition, restaurant efficiency can also be monitored by comparing the time the order is logged with the time the order is filled.

As shown and preferred in FIG. 1, each of the table station terminals 12, 14, 16, 18, 20, which will be described in greater detail hereinafter with reference to FIGS. 2-4 and 7, is preferably connected via a conventional two-way communications link, such as conventional RS-232 lines, to the central computer or processor 22 through a conventional multiplexed communication port 30. The quantity of table station terminals 12, 14, 16, 18, 20, which may be serviced or controlled by the central computer 22 is essentially limited primarily by the capacity of the central computer 22 and associated memory 32 which is selected, the desired functions to be performed and the desired access time, all of which are considerations within the ordinary skill of the art based on the system 10 description provided herein. The central processor 22 and associated memory 32, such as a conventional disk memory, comprise the central or remote data base 22-32 which is remotely accessed by the various table station terminals 12, 14, 16, 18, 20 in accordance with the present invention. By way of example, the central processor 22, which is selected to be compatible with the table station terminals 12, 14, 16, 18, 20 employed, may be one having the capabilities of a PDP 11/23 processor, available from Digital Equipment Corporation, having, by way of example, 128K of memory, with the associated memory 32 being, by way of example a data storage medium of the type such as available from Data Systems Design as its DSD 880 combination flexible and Winchester disk drive. In addition, by way of example, the communications multiplexers 30 may be of the type such as the DLV 11. As further shown and preferred in FIG. 1, a printer 34, such as a conventional dot matrix printer, such as an Anadex 9625A, is connected to the central processor 22 for printing bills, if desired, as well as restaurant management information and any other reports desired, such as market survey data. In addition, a conventional master console terminal 36, such as an ADM-3A, is preferably connected to the central processor 22 to enable, for example, review of restaurant operations and changes to be made in the data base 22-32. If desired, a conventional type of cash register point-of-sale terminal 38 may also be connected to the central processor 22.

With respect to the kitchen terminals 24, 26 and bar terminal 28 employed with the central processor 22, these terminals 24, 26, 28 are preferably conventional and employ touch-sensitive screens, such as the Elographics E270, placed over the video monitor screen, to enable keyboard free data entry, such as, by way of example, to clear an item from the screen after the order has been filled or to indicate order status. The associated processing to be performed by these conventional data terminal 24, 26, 28, which are also selected to be compatible with the central processor 22 employed, if desired, may preferably be limited to requested order display and clearing of filled orders in response to data entry, such as via the aforementioned associated touch sensitive screen, with central computer 22 logging the time that the order is cleared from the screen if desired. Such an exemplary arrangement is illustrated in FIG. 5 which is a self-explanatory condition responsive logic flow diagram of a typical kitchen or bar monitor or terminal processing control program for a typical kitchen or bar terminal 24, 26, or 28, respectively, in the system 10 of the present invention, which may be conventionally programmed by one or ordinary skill in the art based on the description herein. It should be noted that although only two kitchen terminals 24, 26 and one bar terminal 28 are shown by way of example in the system of FIG. 1, any desired number of such terminals may be employed dependent upon the needs of the restaurant and the selected capacity of the system 10.

Referring now to FIGS. 2-4 and 7, a typical preferred table station terminal, such as terminal 12 located at table station 1 in the above example, shall now be described in greater detail. As was previously referred to, the table station terminals 12, 14, 16, 18, 20 are selected to be compatible with the central processor 22 selected. In this regard, preferably the table station terminals are functionally similar to the type marketed, by way of example, by Atari, Inc. as its model 800, or such as the type described in U.S. Pat. No. 4,296,476, the contents of which is specifically incorporated by reference herein in its entirety, conventionally modified to provide a data communications interface or capability with the remote data base 22-32. In this regard, as shown and preferred in FIG. 2, which is essentially the type of terminal described in U.S. Pat. No. 4,296,476, which is a terminal employing a microprocessor 40 based data processor having a programmable graphics generator, the peripheral memory devices, such as a local disk drive unit and cassette unit, have been replaced by the down-line loading capability of the terminal 12 from the remote data base 22-32 into the local random access memory or RAM portion 42a of the terminal's memory unit 42 under control of a master control program or executive or supervisory program, such as illustrated by way of example in FIG. 4, stored in the local read only memory or ROM portion 42b of the terminal memory unit 42. The capacity of the ROM and RAM portions of terminal memory unit 42 is preferably conventionally selected so as to permit the desired functions to be performed by the table station terminal 12.

Figure 2:
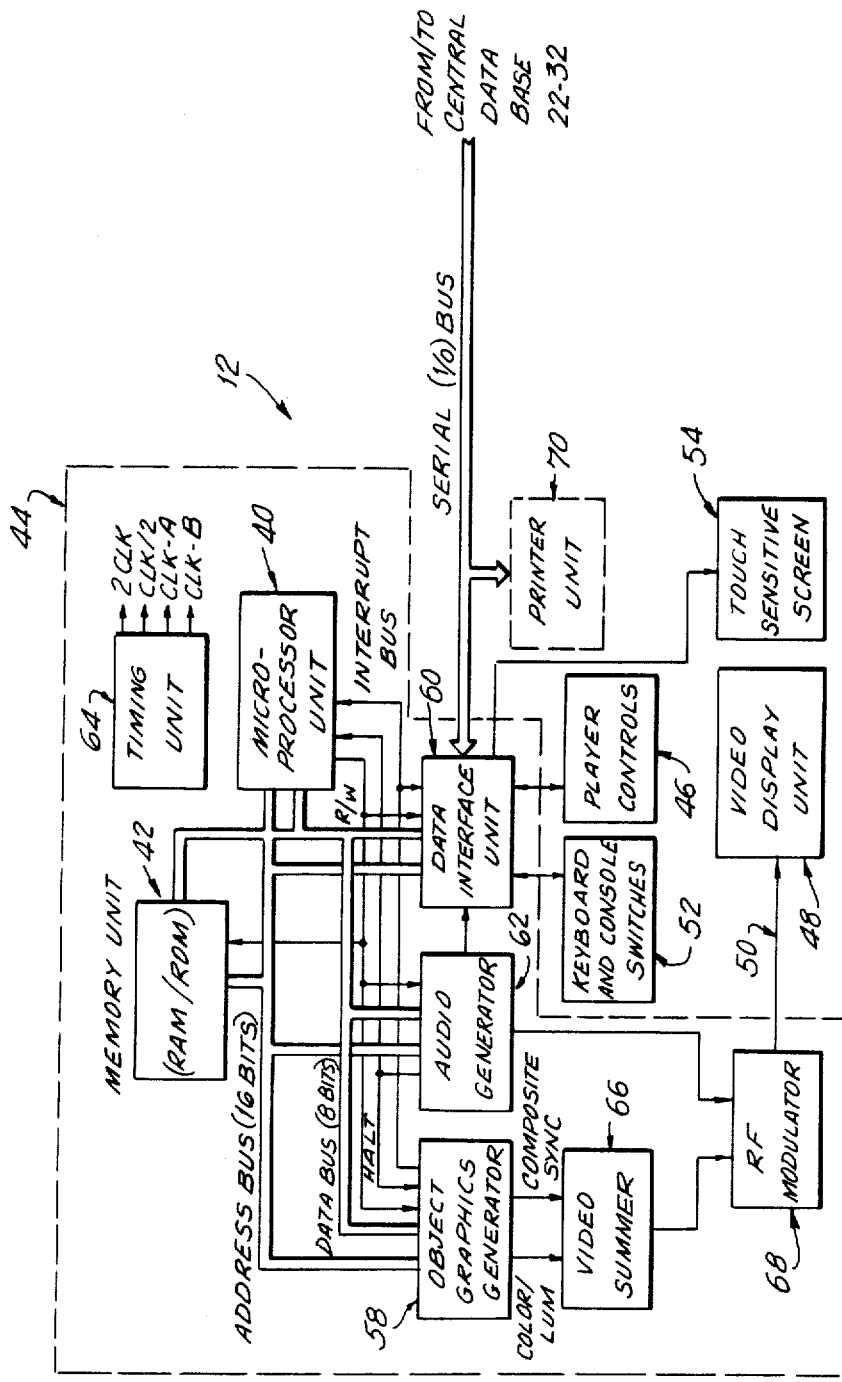
FIG. 2 is an overall schematic block diagram of a typical table station terminal for use in the system of FIG. 1.
Figure 7:
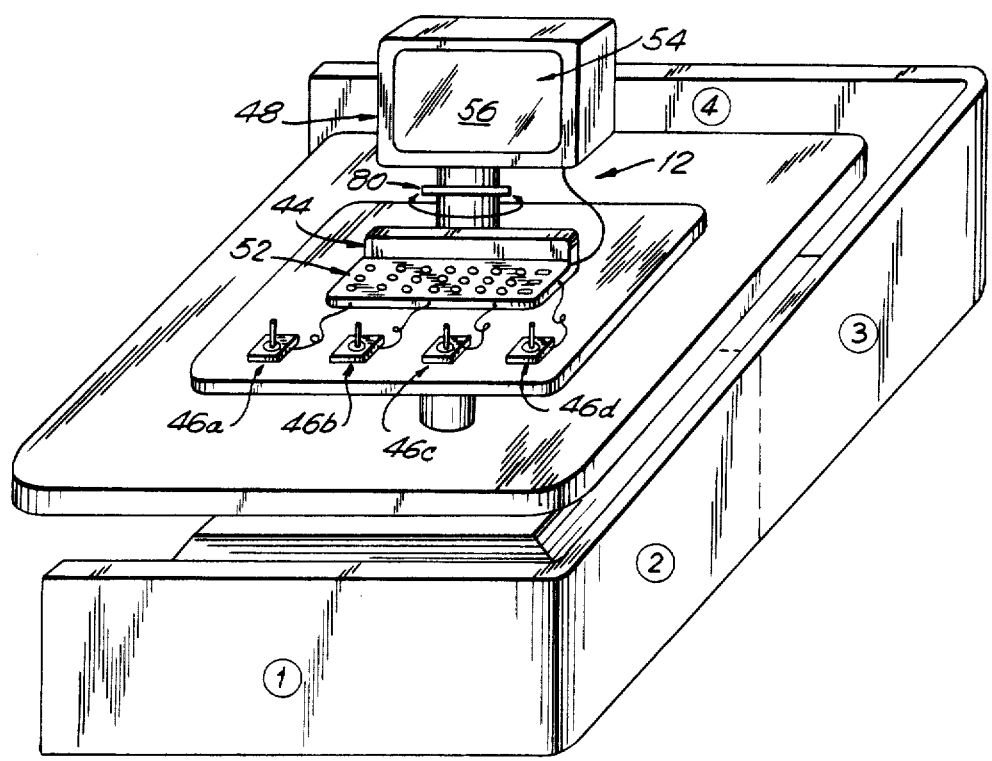
FIG. 7 is a diagrammatic perspective illustration of a typical table station in the system of FIG. 1.

As shown and preferred in FIGS. 2 and 7, the table station terminal 12 includes a console 44, game control apparatus 46, such as the four conventional video game joystick controllers 46a-46d illustrated in FIG. 7, and a video display unit 48, which preferably is a conventional television monitor with console 44 providing a suitable radio frequency signal corresponding to a television raster scan signal to the video display unit 48 via line 50. The table station terminal 12 preferably has two basic modes of operation, the food selection mode and the entertainment mode in which the terminal 12 can function, by way of example, as an interactive video game unit. In the entertainment mode, as will be described in greater detail hereinafter, the table station terminal can be programmed, via down-line loading from the central data base 22-32, to provide various interactive entertainment activities such as interactive video games or interactive educational materials, such as involving text, diagrams and pictures displayed on video diaplay unit 48, as well as audio. An interactive dialogue can be conducted between the restaurant patrons seated at the table station terminal 12, such as at table station 1 in the above example, using a conventional keyboard 52 and/or, if desired, a conventional touch sensitive screen 54, such as the previously mentioned Elographics E270, which could, if desired, preferably be placed over the normal video screen 56, to provide keyboard-free data entry. In either mode, the food selection mode or entertainment mode, the table station terminal is utilized by the restaurant patrons to store or retrieve information from the remotely located central data base 22-32. The video display unit 48 provides the restaurant patrons located at the table station 1 with graphics information, such as an alphanumeric display and/or pictorial graphics, such as for games, that is conventionally formulated and transmitted to the video display unit 48 by the electronics contained in console 44 via the communicating line 50.

Figure 3:
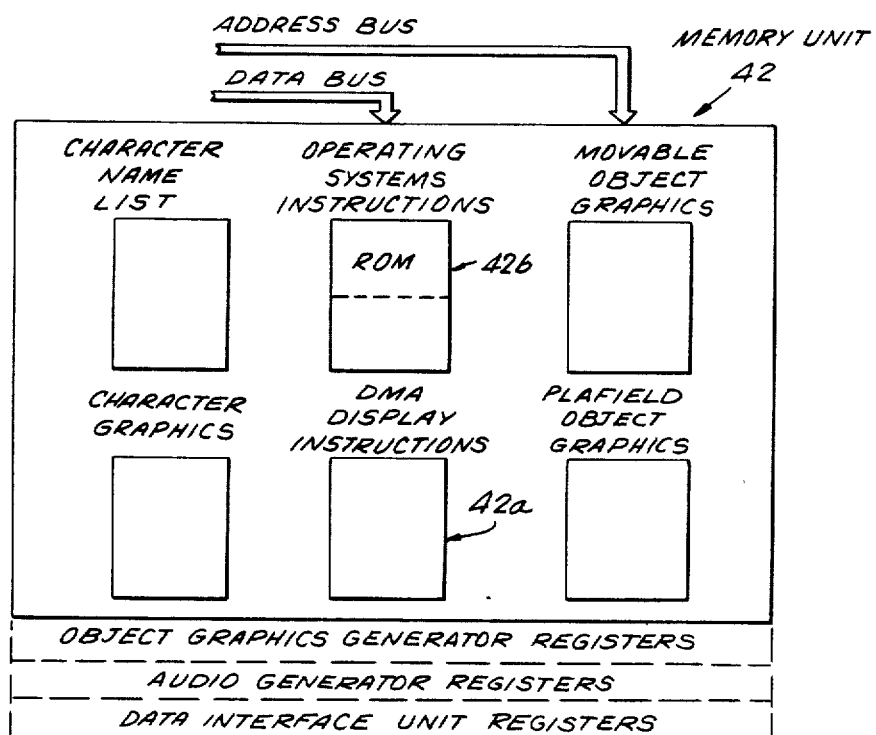
FIG. 3 is an illustrative diagram of a typical organization of the memory unit portion of the terminal of FIG. 2.
Figure 4:
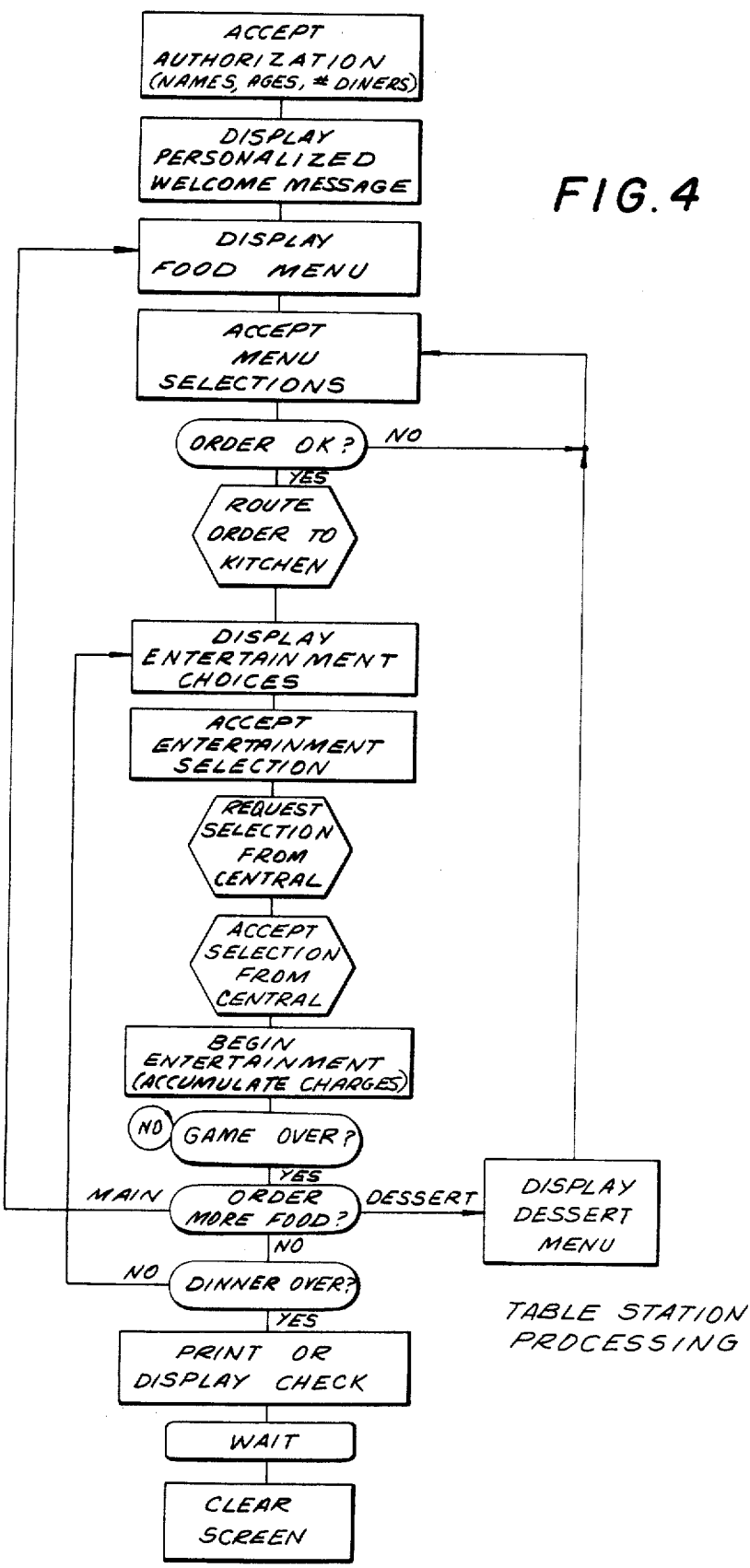
FIG. 4 is a condition responsive logic flow diagram of a typical table station terminal processing control program for the terminal of FIG. 2.

Apart from the master control program or executive or supervisory program for conventionally supervising the overall operation of data manipulation in the table station terminal 12, which is preferably permanently stored in ROM in memory unit 42, the desired operating programs or modules for providing the food selection and entertainment functions of the multipurpose table station terminal 12 are down-line loaded from the central data base 22-32 for storage in the RAM section 42a of memory unit 42 in response to a request therefor which has been input by the restaurant patron via the keyboard 52, or touch sensitive screen 54 if desired. Regardless of the mode in which the table station terminal 12 operates, the operation of the associated internal circuitry illustrated in FIG. 2 remains essentially the same. Thus, the operating program or module, whether a food menu module used for food selection or order entry, or an entertainment module used for entertainment selection and interactive game or other entertainment activity, can display portions of the requisite information or data on video display unit 48. Preferably, the table station terminal 12 includes a conventional programmable object graphics generator 58 which can be called upon to transfer graphics information from memory unit 42 to the video display unit 48. In this regard, the conventional microprocessor unit 40, under direction of the down-line loaded operating program or module, transfers a list of display instructions into the RAM section 42a (FIG. 3) of the memory unit 42, making the display instructions available to the microprocessor 40. The microprocessor 40 can modify portions of the display instructions, such as the addresses of the various instructions, thereby directing the object graphics generator 58 to those sections of the memory unit 42 containing the graphics information to be displayed, such as alphanumeric characters, lines, heading marks and the like. Alternatively, such as in the entertainment mode, the down-line loaded operating program, such as a down-line loaded entertainment module for an interactive video game, may require information to be displayed in graph-like form, such as a playfield display in the form of a cartesian or other coordinate system displayed to the restaurant patron(s) at the table station 1 via video display unit 48. Further, the down-line loaded operating program may call for a moveable cursor to be displayed in which instance the operating program would contain a block of graphics information containing the picture data for the vertical column that the movable object generator 58 constructs on the video display unit 48, including the picture data for the cursor. The microprocessor would then conventionally write into a movable object DMA counter the address of the location within the memory unit 42 of the block of graphics information containing the cursor picture data. The microprocessor 40 would also preferably write a data word to a DMA control register whose contents are used to conventionally inform a DMA control unit that movable object graphics will be displayed. Accordingly, as described in detail in U.S. Pat. No. 4,296,476 specifically incorporated by reference herein, the DMA control unit provides the moveable object DMA counter with signals that cause the DMA counter to sequentially address the memory locations of memory unit 42 containing the graphics information for the cursor. The data used by the microprocessor 40 in the entertainment mode and/or with respect to cursor movement, in either mode, is preferably provided by the joysticks 46a–46d or operation of the keyboard 52, or the touch-sensitive screen 56, by the restaurant patrons seated at the table station 1. Typically, the joysticks 46a–46d, assuming by way of example one for each of up to four restaurant patrons to be seated at the table station 1, provide user generated position information, and possibly other game information, which is communicated to the microprocessor 40 via a conventional data interface unit 60. The conventional joysticks 46a–46d may typically be of the type disclosed in U.S. Pat. No. 4,091,234, the teachings of which are specifically incorporated by reference herein in its entirety. In addition to the above, as further shown and preferred in FIG. 2, the terminal 12 also includes a conventional audio generator 62 for generating audio signals, a conventional timing unit 64 for generating the various timing signals required such as those illustrated, by way of example, for use in the system of U.S. Pat. No. 4,296,476, a conventional video summer circuit 66 for conventionally summing the color/luminance and composite sync signal output of the object graphics generator 58, and a conventional RF modulator 68 which provides the displayable video signal to the video display unit 48 via line 50. Furthermore, an optional conventional printer unit 70 may also be provided at the table station for local printing of bills, or other data if desired, with the printer 70 being connected to the microprocessor 40 via the data interface unit 60 and a serial (I/O) bus through which the terminal 12 is connected to the central data base 22–32. It should be noted that after the desired food menu module or operating program or entertainment module or operating program is requested by and down-line loaded to the terminal 12, the microprocessor 40 can then process incoming data provided via the keyboard 52, player controls 46 or touch sensitive screen 56 in accordance therewith so that food orders may be selected and transmitted back to the central data base 22–32 for billing and filling and/or interactive games may be played. In this regard, FIG. 3 provides an illustrative diagram of a typical organization of the memory unit 42, such as described in U.S. Pat. No. 4,296,478, and FIG. 4 provides a self-explanatory condition responsive logic flow diagram of a typical processing control program for the table station terminal 12, which may be conventionally programmed by one of ordinary skill in the art based on the description herein.

As shown and preferred in FIG. 7, by way of example, preferably each table station has a unique position identification for each restaurant patron to facilitate accurate order filling and billing. Thus, assuming four restaurant patrons per table station by way of example, the various restaurant patrons at table station 1 illustrated in FIG. 7 would identify themselves to the table station terminal 12 as 1-1, 1-2, 1-3 and 1-4. In addition, by way of example, the video display unit 48 could be mounted on a universal swivel 80 so as to be rotatable for viewing by all of the patrons at the table station 1, with the keyboard 52 and joysticks 46a–46d being connected to the terminal 12 via conventional electronic umbilical cords to facilitate use by each patron at the table station 1. It should be noted that the table station configuration shown in FIG. 7 is merely illustrative and many other such configurations will readily occur to one of ordinary skill in the art.

Figure 6:
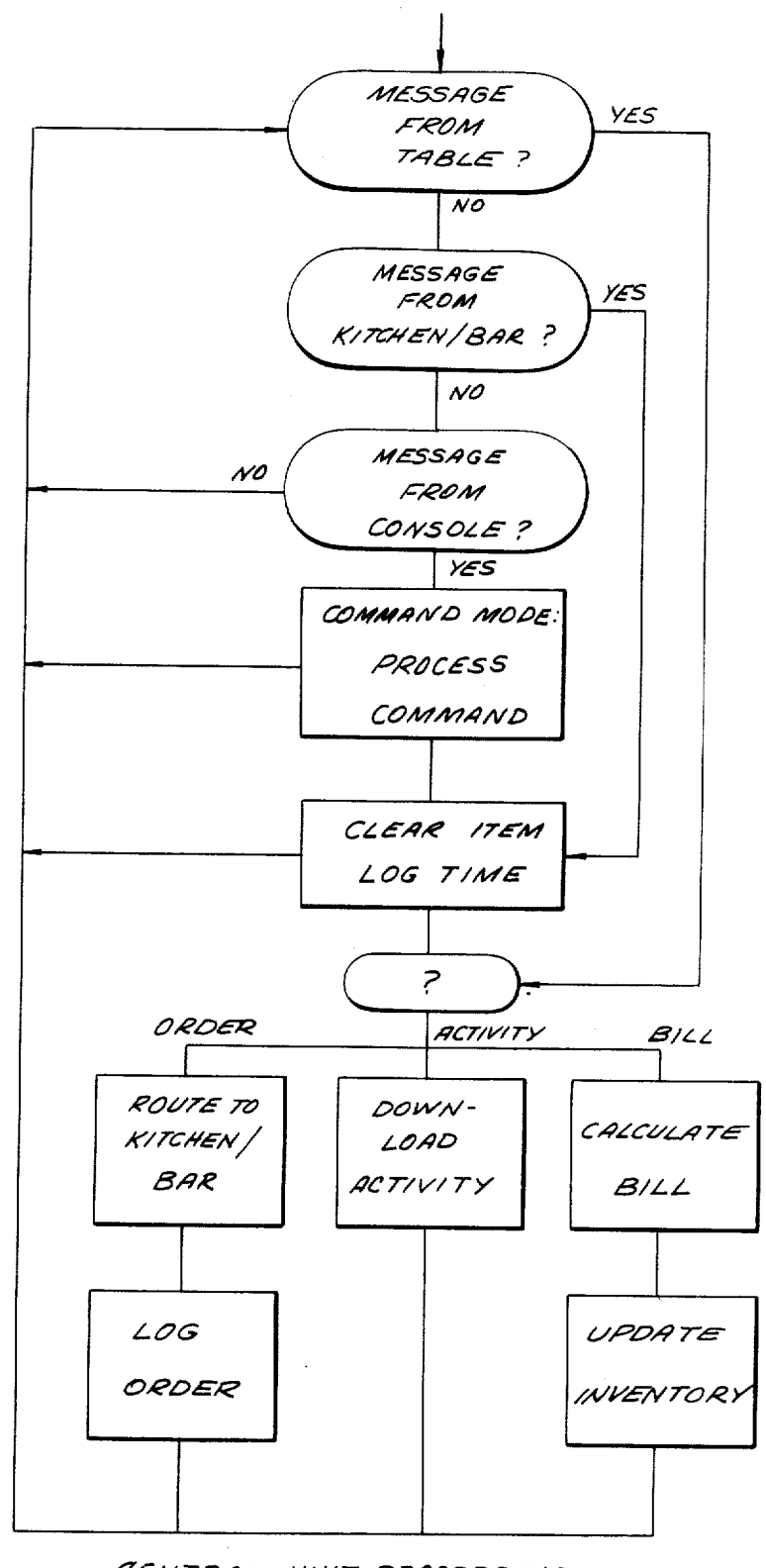
FIG. 6 is a condition responsive logic flow diagram of a typical processing control program for the central computer of the system of FIG. 1.

With respect to the operation of the central data base 22–32 in connection with the processing of food menu and entertainment requests, including the down-line loading of food menu modules or operating programs and entertainment modules or operating programs to the requesting table station terminals 12, 14, 16, 18, 20, the logging and routing of orders to the kitchen and bar terminals 24, 26, 28, the calculation of composite bills, the updating of inventory and the overall processing of messages, a condition responsive logic flow diagram of a typical processing control program for the central computer 22 for accomplishing the above is shown in FIG. 6. The program itself can conventionally readily be written by one of ordinary skill in the art based on the description herein.

Summarizing the overall operation of the preferred system 10 of the present invention, either after or before the diners or restaurant patrons are seated at their respective table station, the table station terminal would preferably display a welcome message and a list of choices for the patrons. The patrons would then select a choice by touching a location on the touch sensitive screen or by pressing keys on the keyboard. The initial choices may be type of food, type of meal, etc. Thereafter, by stepping through various displays, the patrons, using their unique position identification code, could order their meals which would be transmitted to the central data base for billing and filing. The patrons would then be allowed to select entertainment such as games, educational programs, computer generated art displays, etc., and possibly television channels if desired by using a television receiver as the video display unit. Associated charges for both food and entertainment, where applicable, would automatically be added to a composite bill. The central computer downloads the selected activity to the requesting table station terminal, with each terminal being capable of independently requesting and receiving its own operating programs from the central data base. The patrons would then be free to interact with the downloaded operating program, whether it were a food menu module or an entertainment module. If desired, an initialization program could be run daily, or at any time, to set price changes, menu changes, entertainment changes, current time and date, enter deliveries, enter daily specials, etc.

By utilizing the system of the present invention, restaurant efficiency and flexability are enhanced and better control can be achieved.

It is to be understood that the above described embodiments of the invention are merely illustrative of the principles thereof and that numerous modifications and embodiments of the invention may be derived within the spirit and scope thereof.

What is claimed is:

1. A method of interactively integrating food and entertainment patron selection and interaction for a plurality of table stations in a restaurant communication system comprising the steps of remotely retrievably storing and processing information comprising a plurality of displayable food menu modules and entertainment modules at a central data base, providing a plurality of down-line loadable multipurpose table station terminals at a plurality of said table stations, each of said table station terminals comprising microprocessor means, local storage means, selection and control means and local common video type display means capable of providing a video display of patron selected food menu and entertainment modules, each of said retrievably stored food and entertainment modules comprising a different set of control instructions corresponding to a different patron selectable food menu or entertainment function, said microprocessor means being operable in accordance with a locally stored one of said selected sets of control instructions;

individually patron selecting a displayable remotely stored food menu module via said table station terminal selection means;

down-line loading said patron selected corresponding set of control instructions to the selecting table station terminal for local storage thereof;

locally displaying food menu selection data corresponding to said patron selected food menu module on said common video type display means in response to said down-line loaded patron selected set of control instructions, said video displayable food menu module data comprising menu selection data corresponding to a choice of food items to be ordered; individually patron selecting at least one of said video displayed food items for remotely patron ordering said selected food items; transmitting said at least one patron ordered food selection back to said central data base for central processing of said order; individually patron selecting a displayable remotely stored entertainment module via said food ordering table station terminal for video display on said common video type display means at said food ordering table station terminal; down-line loading said patron selected corresponding set of control instructions to said food ordering table station terminal for local storage thereof; locally video displaying entertainment data corresponding to said patron selected entertainment module on said food ordering table station terminal common video type display means in response to said down-line loaded selected set of control instructions to said food ordering table station terminal for enabling interaction with said video displayed entertainment data while said food order is being processed; whereby each table station terminal may independently provide both interactive entertainment and food selection on a common video type display terminal in cooperation with a central data base.

2. A method of interactively integrating food and entertainment selection for a plurality of table stations in a restaurant communication system in accordance with claim 1 further comprising the step of compositely billing charges for a given food ordering table station based on said food and entertainment selections of said down-line loaded information.

3. A method of interactively integrating food and entertainment selection for a plurality of table stations in a restaurant communication system in accordance with claim 2 wherein said composite billing step comprises the step of centrally printing the composite bill for each of said table stations.

4. A method of interactively integrating food and entertainment selection for a plurality of table stations in a restaurant communication system in accordance with claim 2 wherein said composite billing step comprises the step of locally printing the composite bill for said given table station.

5. A method of interactively integrating food and entertainment selection for a plurality of table stations in a restaurant communication system in accordance with claim 1 wherein said remote storing step comprises the step of remotely retrievably storing interactive video games as at least a portion of said entertainment modules.

6. A method of interactively integrating food and entertainment selection for a plurality of table stations in a restaurant communication system in accordance with claim 1 wherein said remote storing step comprises the step of remotely retrievably storing interactive video games as at least a portion of said entertainment modules, said local video display step further comprising the step of locally video displaying a remotely retrieved interactive video game on said food ordering table station terminal common video type display means as said selected entertainment data.

7. A method of interactively integrating food and entertainment selection for a plurality of table stations in a restaurant communication system in accordance with claim 1 further comprising the step of uniquely identifying each restaurant patron at said food ordering table station and transmitting said unique patron identification to said central data base with at least said food selection information for enabling correlated food distribution based on said central processing thereof.

8. A method of interactively integrating food and entertainment selection for a plurality of table stations in a restaurant communication system in accordance with claim 7 further comprising the step of compositely billing charges for a given food ordering table station based on said food and entertainment selections of said down-line loaded information.

9. A method of interactively integrating food and entertainment selection for a plurality of table stations in a restaurant communication system in accordance with claim 1 wherein said central processing step comprises the steps of collecting each food selection from each of said plurality of table station terminals where a selection is made and centrally processing said collected food selections for distribution to said selecting plurality of table stations.

10. A method of interactively integrating food and entertainment selection for a plurality of table stations in a restaurant communication system in accordance with claim 9 further comprising the step of uniquely identifying each restaurant patron at said food ordering table station and transmitting said unique patron identification to said central data base with at least said food selection information for enabling correlated food distribution based on said central processing thereof.

11. A method of interactively integrating food and entertainment selection for a plurality of table stations in a restaurant communication system in accordance with claim 10 further comprising the step of compositely billing charges for a given food ordering table station based on said food and entertainment selections of said down-line loaded information.

* * * * *